United States Patent [19]

Sakakibara et al.

[11] 4,056,566

[45] Nov. 1, 1977

[54] ACIDIC EDIBLE PECTIN HYDROGEL CONTAINING COLLOIDALLY DISPERSED PROTEIN AND METAPHOSPHATE IONS FOR PREVENTING COAGULATION OF THE PROTEIN

[75] Inventors: Sakuichi Sakakibara, Kobe; Ko Sugisawa; Yukio Kitamura, both of Nara, all of Japan

[73] Assignee: House Food Industrial Company Limited, Osaka, Japan

[21] Appl. No.: 791,015

[22] Filed: Apr. 26, 1977

[51] Int. Cl.² ............................................. A23L 1/04
[52] U.S. Cl. ..................................... 426/577; 426/580
[58] Field of Search ................................ 426/577, 580

[56] References Cited

U.S. PATENT DOCUMENTS

| | | | |
|---|---|---|---|
| 2,910,366 | 10/1959 | Leo et al. | 426/577 |
| 3,367,784 | 2/1968 | Waitman et al. | 426/577 |

*Primary Examiner*—Jeanette M. Hunter
*Attorney, Agent, or Firm*—Hans Berman

[57] ABSTRACT

An edible pectin hydrogel containing a colloidally dispersed protein for improved texture, and enough of an edible acid as a taste improving agent to cause coagulation of the protein, is stabilized by a content of sodium metaphosphate.

10 Claims, No Drawings

ACIDIC EDIBLE PECTIN HYDROGEL CONTAINING COLLOIDALLY DISPERSED PROTEIN AND METAPHOSPHATE IONS FOR PREVENTING COAGULATION OF THE PROTEIN

This invention relates to edible gels, and particularly to a precursor composition which is stable in extended storage, and from which an edible gel can be prepared in a simple manner, and to the method of making the gel from the components of the precursor composition or from the composition itself.

Many types of edible gels are consumed as desserts, and precursor products for preparing the gels are staple articles of commerce. It is an object of this invention to provide a stable precursor composition from which an edible gel of pleasant taste and texture is prepared in a simple manner. The invention also provides a method of making the gel from the components of the precursor composition or from the composition itself.

It is known that aqueous pectin solutions are gelled by the admixture of divalent ions, such as calcium and magnesium. Gel foods generally are preferred to have an acidic taste, and gels prepared in a conventional manner from aqueous pectin solutions, divalent metal ions, and enough acid to give them the desirable acidic taste, cannot contain milk or other colloidal solutions of protein because the protein coagulates and makes the gel grainy. If the amount of acid is reduced to avoid coagulation of the protein, the taste of the food is not normally acceptable.

It has now been found that mixtures of aqueous pectin solutions with colloidal dispersions of casein, lactalbumin, and other edible protein containing the necessary amounts of calcium and/or magnesium ions produce homogeneous gels of pleasant texture at pH values well below 6.15 at which the protein would normally coagulate if a small amount of metaphosphate ions is present. An extensive experimental survey of organic and inorganic ions has not led to an equally protective effect of other substances. Sodium metaphosphate is the preferred source of metaphosphate ions because of its ready availability, low cost, and lack of toxicity.

The protein in the gel of the invention formed from pectin and calcium or magnesium ions is essential to the mouth feel and texture of the gel, but it is usually preferred that it not contribute a taste of its own to the gel. Casein and/or lactalbumin prepared from whole milk or whey are the proteins of greatest practical significance for this invention at this time. They normally contain all the necessary calcium ions when combined with the pectin in the form of their joint colloidal solutions, that is, cow's milk which may or may not contain butterfat, and in the form of soluble milk powders. However, egg albumin is operative in the same manner, and soybean proteins present an economically viable alternative to cow's milk. They are pressed as a milk-like colloidal solution from boiled soybeans.

To achieve complete conversion of the dissolved pectin to a gel, the protein should contribute 10 to 30 mg calcium and/or magnesium ions per gram of pectin. If there is not enough calcium or magnesium in the protein, not the entire pectin contributes to the skeleton of the gel, but the deficiency of the protein may be made up by providing calcium or magnesium ions in the form of salts of edible organic or inorganic acids.

As is known in itself, a smooth, acidic gel cannot be obtained from a grade of pectin whose carboxyl groups are esterified with methanol to a large extent. Not more than 40% of the total number of carboxyl groups in the pectin should be esterified with methanol. Pectin containing fewer than 25% carbomethoxy groups, based on the total number of carboxyl groups present, is not readily available. The term "pectin," as used in this specification, will be understood to refer to a product having fewer than 40% esterified carboxyl groups, but more than 25%, although the latter limit is not critical.

For a pleasant taste, an acidic, edible gel should have a pH of 4.2 to 6.15 which may be achieved by means of any nontoxic acid. Citric, malic, lactic, tartaric, acetic acid are merely representative of the wide range of organic acids generally present in food and useful for the gels of this invention. However, hydrochloric, sulfuric, phosphoric, carbonic, and other inorganic acids may provide the required hydrogen ions which account for the refreshing taste of an acidic gel. The non-toxic salts of the afore-mentioned organic acids also contribute to the texture of the pectin-based gel.

The gels of this invention generally consist of 0.4 to 2.0 parts pectin, enough calcium or magnesium ions to cause gelling of the pectin, 0.1 to 30 parts edible acid to adjust the pH to a value between 4.2 to 4.8, 0.1 to 1.5 parts metaphosphate ions, calculated as sodium metaphosphate, 2 to 70 parts edible protein, colloidally dispersed, and 20 to 98 parts water, all parts herein being by weight.

A liquid precursor composition which quickly forms a gel when mixed with cow's milk or soybean milk thus would contain 0.4 to 2.0 parts pectin, 0.1 to 30 parts edible acid, 0.1 to 1.5 parts metaphosphate ions, calculated as sodium metaphosphate, and an amount of water sufficient to dissolve the pectin, acid, and metaphosphate, typically 20 to 70 parts. The gel is formed from the precursor composition by adding 25 to 70 parts whole cow's milk or soybean milk.

A pulverulent precursor composition contains pectin, acid, and metaphosphate in the same range of proportions as the liquid composition, but preferably also 2 to 10 parts colloidally dispersible edible protein, carrying calcium and/or magnesium, such as powdered milk. When the dry, pulverulent mixture is dispersed in cold water, it spontaneously converts to the desired gel.

Pectin powder is not readily dispersed in cold water, and it is more convenient to mix it intimately with a solubilizing agent, such as sucrose, by spray-drying an aqueous solution of pectin and sugar prepared at elevated temperature. Sugar often is a desirable, taste-modifying ingredient in the gels of the invention and may be incorporated therein even where it is not needed for solubilizing the pectin.

Many flavoring agents, natural or artificial, are compatible with the gel-forming ingredients of this invention and may be admixed in a conventional manner.

It is not fully understood at this time why colloidally dispersed protein coagulates in the presence of pectin at pH values higher than would be necessary for causing coagulation in the absence of the pectin. It is thought that the structure of casein micellas is changed by interaction of pectin with colloidal micellas of calcium caseinate, the latter then changing to a hydrophobic state in the presence of hydrogen ions. The double reaction is thought to result in the formation of a calcium bearing gel and to the protein becoming hydrophobic at a pH above its isoelectric point, resulting in coagulation of the protein and its separation from the liquid phase. Metaphosphate ions, not necessarily in the form of sodium metaphosphate, are thought to enter this sequence of reactions in a manner to change the outcome. Homogeneous gels are formed in the presence of small amounts of metaphosphate at pH values as low as 4.2.

The following Examples are further illustrative of this invention, all parts and percentage values being by weight unless specifically stated otherwise.

EXAMPLE 1

20 Parts sucrose, one part pectin, sodium metaphosphate, and citric acid as listed in Table I were dissolved in hot water. The pectin employed in all Examples contained approximately 30% carbomethoxy groups based on the total number of carboxyl groups present therein. The amount of water was sufficient to produce 100 parts of a syrup after the mixture had been held at 85° C for 30 minutes and cooled to ambient temperature thereafter. Equal volumes of the syrup and of whole cow's milk were mixed by stirring for 20 seconds, and the mixture solidified to a gel thereafter within about one minute.

The several gels, which varied in pH from 6.15 to 4.20, as listed in Table I, were of uniform and smooth appearance and had a shiny outer surface. Each gel had a pleasantly uniform, somewhat resilient texture in the mouth and dissolved gradually without passing through a paste-like stage. The taste varied with pH in the expected manner.

TABLE I

| Sodium meta-phosphate,pts. | Citric acid,pts. | pH |
| --- | --- | --- |
| 0.10 | 0.05 | 6.15 |
| 0.20 | 0.15 | 5.60 |
| 0.35 | 0.25 | 5.00 |
| 0.40 | 0.35 | 4.70 |
| 0.50 | 0.45 | 4.50 |
| 0.65 | 0.55 | 4.40 |
| 0.75 | 0.65 | 4.35 |
| 0.85 | 0.70 | 4.20 |

The procedure described above was repeated, but sodium citrate was substituted for the sodium metaphosphate. The amounts of citric acid and sodium citrate in the several gels are listed below in Table II together with the pH of each gel.

TABLE II

| Sodium ci-trate,pts. | Citric acid,pts. | pH |
| --- | --- | --- |
| 0.17 | 0.05 | 6.38 |
| 0.27 | 0.15 | 5.95 |
| 0.37 | 0.25 | 5.45 |
| 0.47 | 0.35 | 5.20 |
| 0.57 | 0.45 | 4.97 |
| 0.60 | 0.55 | 4.85 |
| 0.67 | 0.65 | 4.80 |
| 0.80 | 0.70 | 4.70 |
| 0.67 | 0.70 | 4.60 |

Gels comparable in quality with those prepared in the presence of sodium metaphosphate were obtained in the second series of tests only down to pH 4.95. At pH 4.85 and 4.80, the gels appeared to the naked eye to be uniform and homogeneous in texture, but they lacked the surface lustre evident at higher pH. In the mouth, gels of pH 4.85 or 4.80 dissolved less readily than the less acidic gels and had a paste-like quality. The gels initially produced at pH 4.70 and 4.60 quickly decomposed by coagulation of protein from a liquid residual phase. The product had a distinctly grainy taste.

Approximately the same, unfavorable results at low pH were observed, when the sodium citrate was replaced by sodium tartrate, sodium malate, sodium pyrophosphate, and sodium polyphosphate in a buffer combination with citric acid.

EXAMPLE 2

20 Parts sucrose, 1 part pectin, 0.4 part citric acid, 20 parts orange juice, 0.5 part sodium metaphosphate, and enough water to make 100 parts were mixed and held at 80° C for 10 minutes to produce a homogeneous solution. The solution was sterilized at 85° C for 30 minutes in a water bath, cooled to room temperature, and mixed with an equal volume of whole cow's milk by stirring for 20 seconds. The mixture so produced had a pH value of 4.5 and gelled quickly.

The gel had a pleasantly acidic orange taste and a smooth texture in the mouth without trace of pastiness. It appeared perfectly homogeneous to the eye and had a shiny surface.

EXAMPLE 3

The procedure outlined in Example 2 was repeated with minor changes with a mixture of 20 parts sucrose, 1 part pectin, 0.6 part citric acid, 10 parts strawberry pulp, 0.8 parts sodium metaphosphate, and 67.6 parts water which was sterilized at 90° C for 20 minutes. The gel produced by mixing the sterilized and cooled strawberry syrup with milk had a pH of 4.35, a pleasant strawberry taste, and other properties equal to those of the gel produced in Example 2.

EXAMPLE 4

40 Parts sucrose, 40 parts pineapple juice, 2 parts pectin, 0.4 part citric acid, 0.8 part sodium metaphosphate, and enough water to make 100 parts were held at 75° C for 15 minutes. The syrup so obtained was canned, sterilized in hot water at 80° C for 35 minutes, cooled to ambient temperature and stored.

Eventually, the syrup was mixed by stirring for 20 seconds with twice its volume of soybean milk, the milk-like liquid obtained by boiling soybeans and pressing the boiled beans. The mixture had a pH of 4.5 and gelled quickly.

The gel, except for its pineapple taste and flavor, had the pleasant properties described above with reference to the gels of Examples 2 and 3.

EXAMPLE 5

1300 g Sucrose and 65 g pectin powder were mixed, and the mixture was dissolved in 10 liters water by stirring for 10 minutes at 80° C. The solution was spray-dried in a conventional manner, and the powder so obtained was mixed in an amount of 25 parts with 10 parts powdered skim milk solids, 0.57 part powdered citric acid, and 0.73 part powdered sodium metaphosphate. When the powder mixture was stirred into 165 parts cold water, a gel having a pH of 4.4 formed within 30 seconds.

Except for the lacking fruit flavor, the gel was closely similar to the products of Examples 2 to 4.

What is claimed is:

1. An edible gel consisting essentially, in parts by weight, of 0.4 to 2.0 parts pectin, an amount of calcium or magnesium sufficient to cause gelling of said pectin, 0.1 to 30 parts of an edible acid, 0.1 to 1.5 parts metaphosphate ions, calculated as sodium metaphosphate, 20 to 98 parts water, and 2 to 70 parts of an edible protein, not more than 40% of the carboxyl groups in said pectin being esterified with methyl, the amount of said acid being sufficient to impart a pH of not more than 6.15 to said gel, and said protein being colloidally dispersed in said gel.

2. A gel as set forth in claim 1, wherein the number of esterified carboxyl groups in said pectin is at least 25% of the total number of carboxyl groups present in said pectin.

3. A gel as set forth in claim 1, wherein the amount of said acid is sufficient to impart a pH of not less than 4.2 to said gel.

4. A gel as set forth in claim 1, wherein said protein is a protein of cow's milk or of soybeans, and contains said calcium or magnesium.

5. A liquid precursor composition converted to the gel set forth in claim 1 when mixed with 25 to 70 parts of cow's milk or soybean milk and consisting essentially of an aqueous solution of 0.4 to 2.0 parts of said pectin, 0.1 to 30 parts of said acid, and 0.1 to 1.5 parts of said metaphosphate ions.

6. A composition as set forth in claim 5, wherein said acid is an organic acid.

7. A composition as set forth in claim 5, wherein said acid is citric, malic, lactic, tartaric, or acetic acid.

8. A solid, particulate precursor composition converted to the gel set forth in claim 1 when mixed with 60 to 98 parts water and consisting essentially of said pectin in readily soluble form, said acid, said metaphosphate ions, said edible protein in readily water-soluble form, and said calcium or magnesium in ionizable form.

9. A composition as set forth in claim 8, wherein said protein consists essentially of powdered milk solids containing said calcium or magnesium.

10. A composition as set forth in claim 8, further containing an amount of sucrose intimately mixed with said pectin and sufficient to facilitate dissolution of said pectin in cold water.

* * * * *